March 11, 1930.  H. ALBERTINE  1,750,150
HIGH POWER GREASE GUN
Filed May 12, 1927  2 Sheets-Sheet 1
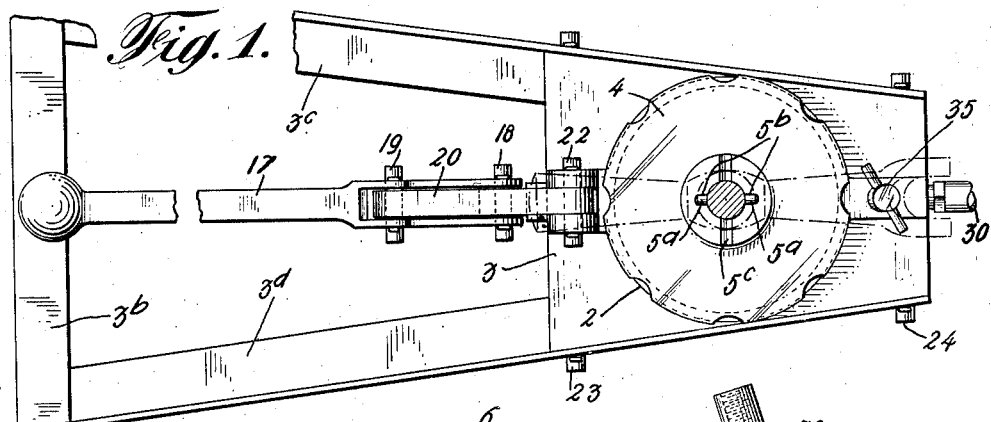
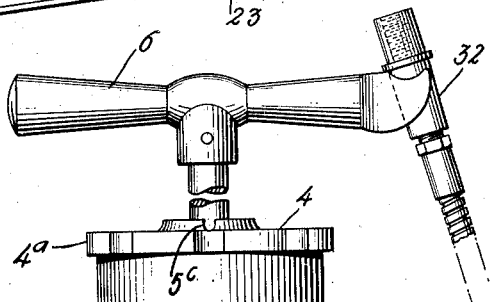
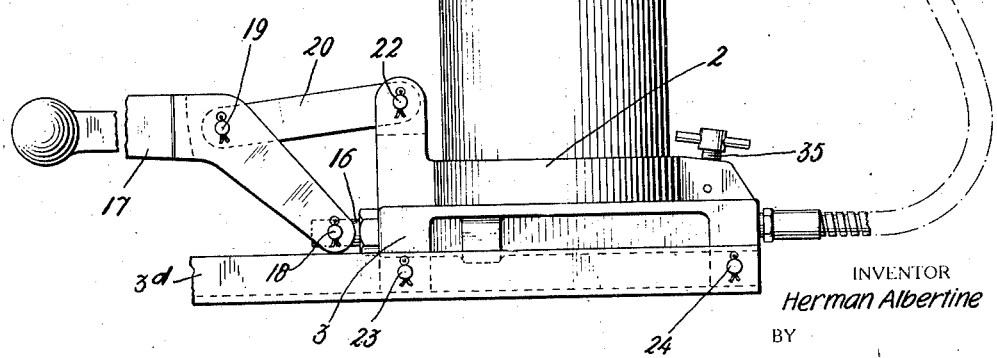
INVENTOR
Herman Albertine
BY
George C. Dean ATTORNEY March 11, 1930.  H. ALBERTINE  1,750,150
HIGH POWER GREASE GUN
Filed May 12, 1927   2 Sheets-Sheet 2
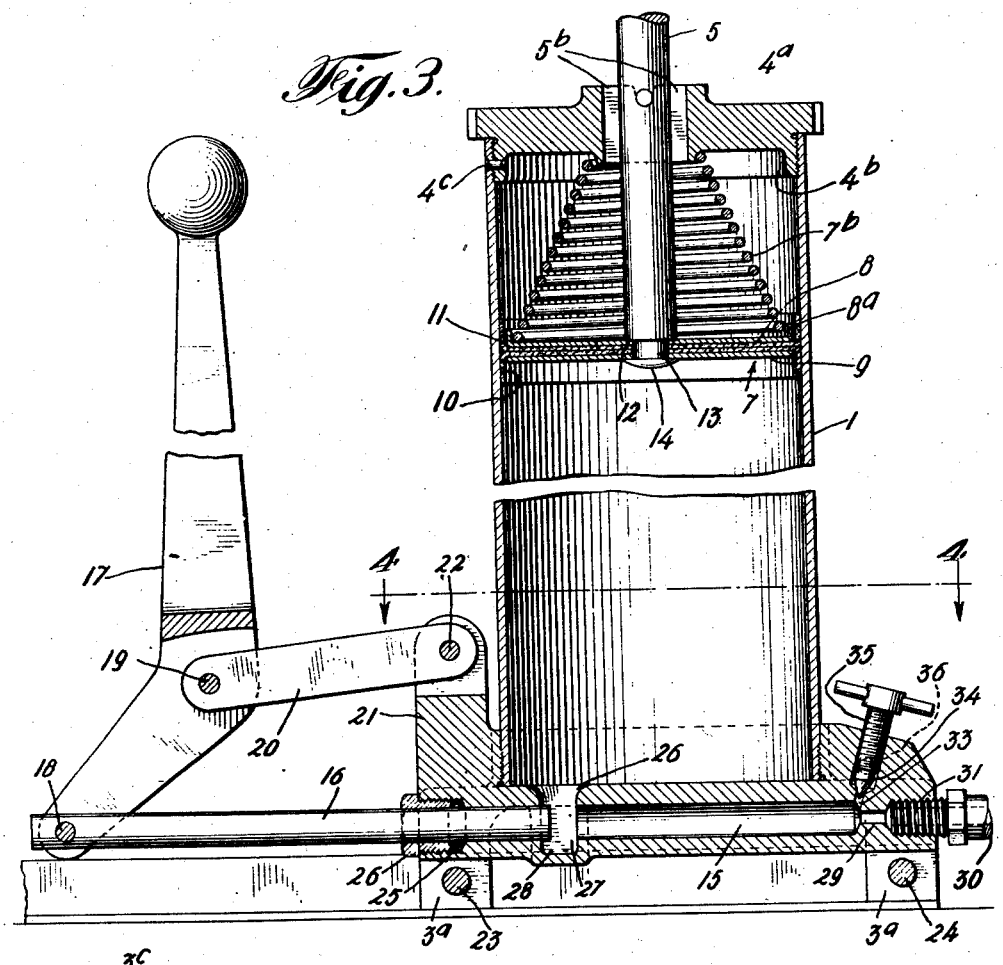
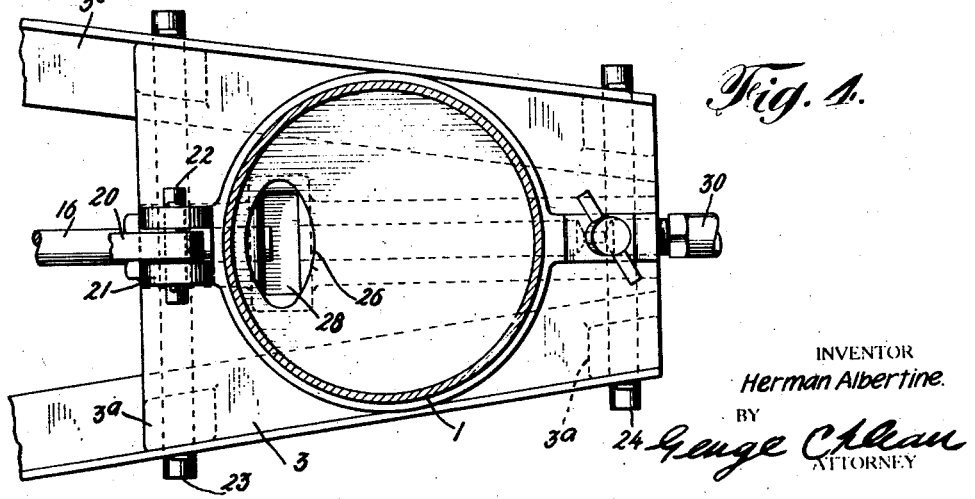
INVENTOR
Herman Albertine.
BY
George C. Klean
ATTORNEY Patented Mar. 11, 1930

1,750,150

UNITED STATES PATENT OFFICE

HERMAN ALBERTINE, OF EAST RUTHERFORD, NEW JERSEY, ASSIGNOR, BY MESNE ASSIGNMENTS, TO ROGERS PRODUCTS CO. INC., A CORPORATION OF NEW JERSEY

HIGH-POWER GREASE GUN

Application filed May 12, 1927. Serial No. 190,726.

My present invention is shown as embodied in an apparatus designed to supply oil or grease to bearings that are used in place of grease cups in accordance with the lubricating system described in British patent to Alley, et al., No. 21,893 of 1906. Such fittings or the ducts leading therefrom to the bearings, particularly on automobiles, trucks, etc., frequently become clogged with dirt, hardened lubricant, etc., to such an extent that it is impossible to force grease, or even oil through them by any of the force-feed lubricators or grease guns now available for the purpose. On the other hand, there are special cold weather conditions of ordinary grease where the lubricant is too viscous and special kinds of grease that are too sticky for use in any of the now known force-feed devices.

I have discovered, however, that in actual practice, clogged grease ducts can be blown clear in almost all cases by forcing in the grease under pressures in the neighborhood of 10,000 to 30,000 pounds per square inch. While much higher pressures are easily attainable by my apparatus, actual experience seems to show that most clogged ducts blow through within the above range unless positively closed as by a fragment of stone or metal large enough and hard enough to require drilling.

For general use, my pump is equipped with a flexible metal conduit terminating in any suitable coupling, but it is obvious that for special uses the coupling may be made to fit any particular grease cup fitting or any special nipple that may be desired.

The pump which I have devised is designed to obviate all valves in the pump structure and enables perfect handling of ordinary cold grease or special sticky grease, the pump cylinder inlet being opened and closed by the pump piston and there being no exit check valve at the cylinder outlet and preferably none in the coupling.

A structural advantage of my device is that it comprises a very small capacity, very high power plunger pump, integral with a base carrying a reservoir supplying grease to the pump and having a lever and lever-actuated link or toggle connections arranged to enable the application of very high power to the pump, and said base is fitted with a detachable extension or platform extending in the direction of the pump handle so that any desired power may be exerted on the handle either to raise or lower the same without any tendency to tilt either the pump or the reservoir.

Another feature is that of having the pump cylinder arranged horizontally below the supply reservoir or cylinder so that grease from the latter can flow directly therefrom into the intake of the pump.

With my valveless pump there is less building up of pressure in the flexible conduit by successive strokes than would occur with a pump having an outlet check valve to accumulate and hold the pressure between successive strokes. But the cylinder outlet is preferably somewhat constricted so that by a succession of quick return and slow forward strokes, the pressure may be built up very materially. The compensating advantage is that by a slow return or suction stroke or by having the plunger in the rearmost position, the grease will quickly ooze back through the constriction and release the coupling so it may be easily rotated to unlocked position.

When the coupling is attached to a fitting for the duct of a machine, the quick return stroke of the piston will develop considerable suction, but, the large reservoir port being quickly opened will permit this suction to be satisfied by grease from the reservoir, the suction being assisted by the pressure on the grease in the reservoir.

The above and other features of my invention may be more fully understood from the following description in connection with the accompanying drawings, in which Fig. 1 is a top plan view and Fig. 2 is a side elevation of one embodiment of my invention;

Fig. 3 is a vertical central section; and

Fig. 4 is a top plan view taken in section on the line 4—4 of Fig. 3.

In the embodiment of the invention shown in Figs. 1 to 4, a grease reservoir is shown as comprising a cylinder 1, screwed into an annular collar 2, integral with a suitable base 3. The cylinder may conveniently be a drawn steel tube, say 3 inches internal diameter with 1/8 inch walls and say 18 inches long. The cylinder 1 is closed at the top by a cap 4 having a radially extending flange $4^a$ abutting the top of the cylinder, and a depending screw threaded flange $4^b$ which when screwed down tight is permanently and irremovably secured as by a blind rivet $4^c$. Mounted in the cap is a vertical rod 5 having at the upper end an operating handle 6 and at its lower end a piston head 7 comprising a pair of clamping plates 8 and 9 preferably in the form of a downwardly directed cup leather 10 and an upwardly directed cup leather 11. The piston head is secured to the rod 5 in any suitable way as by forming the latter with a shoulder 12, reduced shank 13, and a rivet head 14 on the lower end of the latter, riveted down on the clamping plate 9 which is preferably of a diameter nearly as great as the cup leather 10.

The piston is normally spring-pressed downwardly by a spring $7^b$ preferably cone shaped and having its small end centered about the depending boss, $4^d$, on the lower face of the closure, 4, and its lower end centered by an upstanding marginal flange, $8^a$, on the clamping plate 8.

The piston may be retracted, compressing the spring, by means of the handle 6 and may be locked in such position by rotating the handle to bring the projecting heads of pins $5^a$, $5^a$, first into registry with slots $5^b$ in a cover, while retracting and then to bring the pins out of registry with said slots. A locking groove $5^c$ may be provided to prevent accidental rotating of the pins to a releasing position. With the pins thus seated, the rod 5 is locked to the head 4 and, the head being permanently locked to cylinder 1, as described, the latter may be unscrewed from the base at 2, using the handle 6 as a wrench. The piston 7 remaining locked in retracted position, the cylinder may be packed with grease through its open end and the cylinder again screwed to the base.

The base 3 carries, preferably integral therewith, the pump cylinder 15 in which slides a rod plunger 16 which is operated by a lever 17 secured to the plunger by pivot 18. The lever is fulcrumed on pivot 19 at the end of link 20 which is pivoted to an upper projection 21 of the base pivoted at 22. It will be apparent from Figs. 2 and 3, that a very powerful toggle-like action on the plunger 16 may be effected by the lever 17 and the toggle-like arrangement, the handle 17 assuming a substantially horizontal position at the end of its stroke so that it may conveniently be pressed down by the foot. Preferably, the base 3 has a flat portion with forwardly converging sides and having the legs $3^a$ at its corners, affording a base area amply sufficient for stable support until great stress is applied to the long handle 17 in operating the plunger 16. To take care of the latter condition, the flat portion of the base is removably fitted into an operating base of tapered form comprising a downwardly presented angle iron $3^b$ rigidly secured as by spot welding between two longitudinally upwardly presented angle irons $3^c$ and $3^d$ converging inwardly from the angle iron $3^b$ to provide a portion at their farther ends to receive the legs $3^a$ which are arranged along the converging sides. The base 3 is secured to the angle irons $3^c$ and $3^d$ by rods 23 and 24 extending through openings in the legs $3^a$ and openings in the upright flanges of the angle irons $3^c$ and $3^d$, the pins or rods 23 and 24 being held in locked position by suitable means such as cotter pins passing through openings adjacent the ends of said pins or rods.

To provide a tight fit for the plunger 16 in the base 3, a packing ring 25 of suitable material may be placed in a packing recess at the outside of the base and pressed firmly into effective position by a packing nut or gland screwed into said opening. The grease passes from the reservoir into the cylinder 15 through an inlet or port 26 which is flared outwardly at its top as clearly shown in Figs. 3 and 4 and communicates with a passage 27 extending completely around the cylinder 15 so as to permit the supply of grease to the cylinder 15 from all sides the instant the head of the piston begins to clear the wall of the port. In the working stroke of the plunger 16, the grease which has entered the pump cylinder 15, is pressed forwardly through a reduced bore 29 to a flexible conduit 30 provided with a nipple 31 to be screwed into the base 3. The conduit 30 may be a flexible metal conduit adapted to sustain very high internal pressure and provided at its outer end with a fitting 32 to be screwed over a fitting on a machine to be lubricated. The more constricted the bore or passage 29, the slower the forward stroke is likely to be, but the return strokes may be very quick and a new forward stroke may be begun before much grease can flow back in reduction of pressure of the hose. Consequently, considerable pressure may be built up by a few quick strokes prior to the final maximum effort on the toggle.

The handle 6 may have one end formed somewhat like a telephone receiver hook for holding the coupling end or fitting 32 of the hose.

At its outer end, the pump cylinder 15 communicates through a priming outlet or vent 33 to a bore 34 into which is screwed a plug 35 having a reduced inner end terminating in a conical point normally projecting into the upper end of the passage 33 at the conical lower end of the bore 34. At one side of the bore there is an opening 36 through which air or lubricant forced past the conical point of the plug 35 may be vented.

Such a relief valve or vent at the outlet end of the pump cylinder has a distinct advantage in connection with the force feed applied to the grease by the spring 7$^b$, particularly where the grease is loaded into the reservoir cylinder from the open end thereof. In actual operation, I find that there is a selective segregation and outflow of the air preferentially to outflow of the grease. After the reservoir has been filled, I find that by opening the valve controlled by the plug 35 when passage through the pump outlet is resisted, the air will to a large extent disengage itself and a few strokes of the pump will completely prime the pump so that the piston 14 can suck on inexpansible grease instead of on elastic air. Sometimes a repetition of this operation of opening the priming valve and reciprocating the pump plunger may be necessary before all of the air is expelled from the cylinder, but it is a remarkable fact that any air seems to entirely disentangle itself from grease in the reservoir as a result of not more than two such operations. Thereafter, the pump has only solid grease to operate thereon.

The priming vent valve just described may also be used at any time to relieve pressure in the hose 30 or the duct to which it is connected. With the present valveless pump there is no such building up of pressure in the hose as with most high pressure grease pumps and consequently there is very seldom any necessity for using this valve for relief purposes.

Normally, the lower end of the reservoir may be kept closed by leaving the plunger 16 in advanced position.

I claim:

1. Lubricating apparatus, including a flexible conduit for delivering grease at various near or remote points; a grease pump for supplying grease to said conduit, including a relatively long, small-area pump cylinder provided at one end with a valveless outlet discharging into said conduit and a relatively short inlet near the other end thereof, in communication with a reservoir having means for force feeding grease into said inlet; a long, valveless plunger adapted to substantially fill said cylinder, and power multiplying means for reciprocating it, to cover and close said inlet for the major portion of its expelling stroke, but to uncover the same for inlet of grease toward the end of its retracting stroke, thereby operating to produce alternate pressure and approximate vacuum conditions in the major portion of the length of said pump cylinder; said valveless outlet being of much smaller cross section area than either the pump or the conduit whereby return flow of grease from the conduit in response to said vacuum condition in the pump is extremely slow; a cast metal base having a reservoir seat at the top and laterally projecting marginal portions and having the pump cyclinder extending horizontally therein; the power multiplying means for the plunger including a lever having a fulcrum link connection with said base and a weight arm connection with the plunger smaller than the fulcrum link connection and arranged so that the handle of the lever is approximately horizontal at the end of the expelling stroke; all in combination with a supplemental base frame to which said marginal portions of the case metal base are detachably secured, said base consisting of a frame including angle irons affording horizontal and vertical retaining flanges for said marginal portions and extending beneath the pump handle to a distance substantially equal to the projection of the latter when in the horizontal position.

2. Lubricating apparatus, including a flexible conduit for delivering grease at various near or remote points; a grease pump for supplying grease to said conduit, including a relatively long, small-area pump cylinder provided at one end with a valveless outlet discharging into said conduit and a relatively short valveless inlet near the other end thereof, in communication with a reservoir having means for force feeding grease into said inlet; a long, valveless plunger adapted to substantially fill said cylinder, and power multiplying means for reciprocating it, to cover and close said inlet for the major portion of its expelling stroke, but to uncover the same for inlet of grease toward the end of its retracting stroke, thereby operating to produce alternate pressure and approximate vacuum conditions in the major portion of the length of said pump cylinder; said valveless outlet being of much smaller cross section area than either the pump or the conduit whereby return flow of grease from the conduit in response to said vacuum condition in the pump is extremely slow for the purpose described.

3. Lubricating apparatus, including a flexible conduit for delivering grease at various near or remote points; a grease pump for supplying grease to said conduit, including a small-area pump cylinder provided at one end with a constricted outlet discharging into said conduit and with an inlet near the other end thereof, in communication with a reservoir having means for force feeding grease into said inlet; a long, valveless plunger adapted to substantially fill said cylinder, and power multiplying means for reciprocating it, to cover and close said inlet for the major portion of its reciprocation; said grease pump including a cast metal base having a reservoir seat at the top, in which said reservoir is screwed, and having laterally projecting marginal portions and having the pump cylinder formed and extending horizontally therein; and said power multiplying means for the plunger including a lever having a fulcrum connection with said base and a weight arm connection with the plunger of less length than the length of said fulcrum connection, and arranged so that the handle of the lever is substantially horizontal at the end of the expelling stroke; all in combination with a supplemental base frame to which said marginal portions of the cast metal base are detachably secured, said base consisting of a frame including angle irons affording horizontal and vertical retaining flanges for said marginal portions and having a portion extending beneath the lever handle to a distance substantially equal to the projection of the latter when in the horizontal position.

4. A grease pump, including a vertical grease container, an outlet at the lower end thereof, a horizontal pump cylinder in communication with said outlet, a plunger in said cylinder, an outlet of reduced cross-section for said cylinder, and power multiplying means for actuating said plunger including a bent lever and a fulcrum link pivotally connected to each other, to said plunger and to a point above and adjacent the rear end of the pump cylinder, the link being substantially longer than the weight arm of the lever and the whole being proportioned and arranged so that at the end of expulsion stroke of the piston, the handle will be substantially horizontal and there will be a substantially toggle effect on the plunger.

5. A valveless grease pump, including a small area plunger, a pump cylinder in which said plunger fits, a valveless outlet of reduced cross-section and high flow resistance at one end of the cylinder affording direct and uninterrupted communication with a grease conduit to carry the grease to the required points, an inlet near the other end of the cylinder and opened by the withdrawal of the forward end of the plunger past the same, and means for supplying said inlet with grease under pressure, whereby high pressure may be obtained and built up in said grease conduit by repeated reciprocations and can be released by prolonged retraction of said plunger.

6. A grease pump, including a horizontally reciprocating, small area plunger, power multiplying means for reciprocating it including a down-stroke lever for the expelling stroke, a horizontal pump cylinder provided with an inlet communicating directly at one side thereof with a grease reservoir, grease being fed into said cylinder when said plunger is retracted sufficiently to admit grease from said inlet, in combination with a combined priming vent and relief valve at the outlet end of said cylinder.

7. A grease pump, including a horizontally reciprocating plunger, a lever and link arranged as a toggle multiplying means having a down stroke lever for reciprocating it, the link being longer than the weight arm of the lever, a horizontal pump cylinder provided with an inlet at one side thereof communicating directly with a supply reservoir, grease being fed into said pump when said plunger is retracted sufficiently to admit grease from said inlet to the pump cylinder and a constricted outlet for said pump cylinder.

8. A grease pump, including a plunger, power multiplying means for reciprocating it, including link means and a lever the link being longer than the weight arm of the lever to cause toggle action and permit of the lever handle swinging to approximately horizontal at the end of the expelling stroke, a pump cylinder with a constricted outlet, a valveless inlet of large capacity at the end opposite the outlet, a grease container in free communication with said valveless inlet and means for maintaining grease in said container under continuous pressure.

9. In combination, a grease gun container having an outlet at the lower end thereof, a cast metal base therefor, a horizontal pump cylinder in said base communicating with said outlet, a pump plunger within said cylinder, a constricted outlet for said cylinder, power multiplying means for actuating said pump plunger comprising a lever having a fulcrum link connection with said base and arranged to extend downward and away from said container on the pressure stroke, and a frame detachably secured to said base and extending beneath said lever to prevent tilting of said container and base when operating said lever.

Signed at New York city, in the county of New York, and State of New York, this 11th day of May, A. D. 1927.

HERMAN ALBERTINE.